(12) United States Patent
Kaku et al.

(10) Patent No.: US 7,916,679 B2
(45) Date of Patent: Mar. 29, 2011

(54) WIRELESS NETWORK SYSTEM, WIRELESS COMMUNICATION INSTRUMENT, WIRELESS COMMUNICATION INSTRUMENT SETTING DEVICE, GAME PROCESS CONTROL METHOD, INFORMATION STORAGE MEDIUM, AND PORTABLE ELECTRONIC INSTRUMENT

(75) Inventors: Ryoichi Kaku, Fujisawa (JP); Yasushi Omori, Fujisawa (JP)

(73) Assignee: Namco Bandai Games Inc., Tokyo (JP)

( * ) Notice: Subject to any disclaimer, the term of this patent is extended or adjusted under 35 U.S.C. 154(b) by 1036 days.

(21) Appl. No.: 11/727,468

(22) Filed: Mar. 27, 2007

(65) Prior Publication Data

US 2007/0286109 A1 Dec. 13, 2007

(30) Foreign Application Priority Data

Mar. 29, 2006 (JP) ................................. 2006-092000
Dec. 15, 2006 (JP) ................................. 2006-337989

(51) Int. Cl.
*H04W 4/00* (2009.01)
(52) U.S. Cl. ....... 370/313; 455/410; 455/411; 455/3.03; 455/420; 370/328; 370/338
(58) Field of Classification Search .................. 455/410, 455/411, 3.03, 420; 370/313, 328, 338
See application file for complete search history.

(56) References Cited

U.S. PATENT DOCUMENTS

| 6,567,948 B2 * | 5/2003 | Steele et al. .................. 714/746 |
| 2004/0253969 A1 | 12/2004 | Nguyen et al. |
| 2007/0005974 A1 * | 1/2007 | Kudou .......................... 713/171 |
| 2007/0019810 A1 * | 1/2007 | Suzue ............................. 380/203 |
| 2007/0073937 A1 * | 3/2007 | Feinberg et al. ................. 710/62 |
| 2007/0197197 A1 * | 8/2007 | Minear ...................... 455/414.1 |

FOREIGN PATENT DOCUMENTS

| JP | A 2001-96069 | 4/2001 |
| JP | A-2003-274454 | 9/2003 |
| KR | A-2004-0049533 | 6/2004 |

OTHER PUBLICATIONS

Chandra et al; "Beacon-Stuffing: Wi-Fi Without Associations"; Proceeding of IEEE HotMobile; Feb. 26-27, 2007.

* cited by examiner

*Primary Examiner* — Patrick N Edouard
*Assistant Examiner* — Justin Y Lee
(74) *Attorney, Agent, or Firm* — Oliff & Berridge, PLC

(57) ABSTRACT

In a game system including a wireless LAN AP instrument and a portable game device, the AP instrument transmits a beacon signal including a MAC address of the AP instrument and a network ID obtained by encoding an instruction code so that the network ID can be decoded using the MAC address. The portable game device decodes the network ID included in the received beacon signal using the MAC address, and executes control based on control data when authenticity determination data included in the decoded instruction code coincides with specific data and the present date is within a valid period indicated by valid period data.

15 Claims, 11 Drawing Sheets

FIG. 3
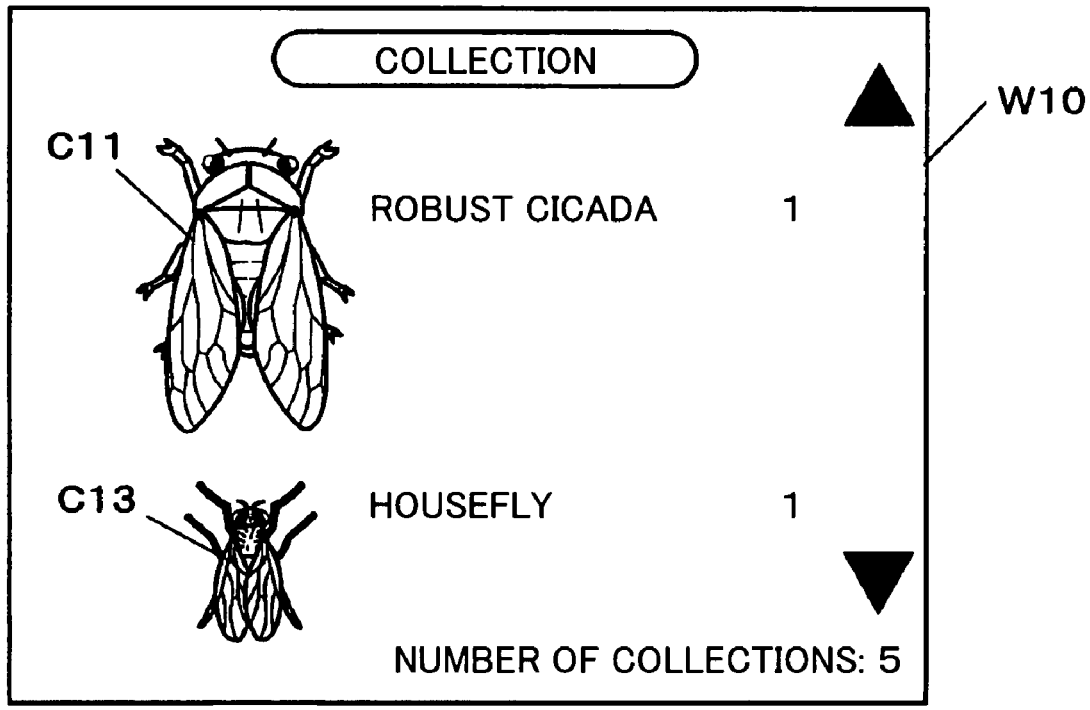
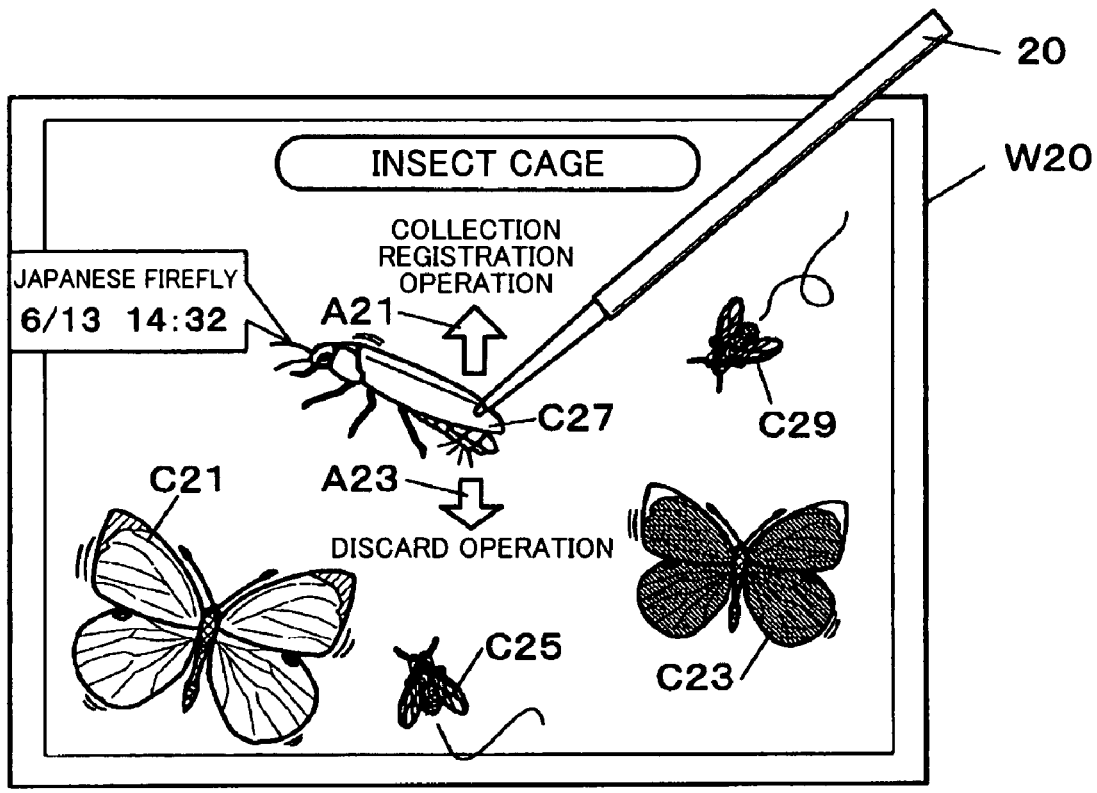

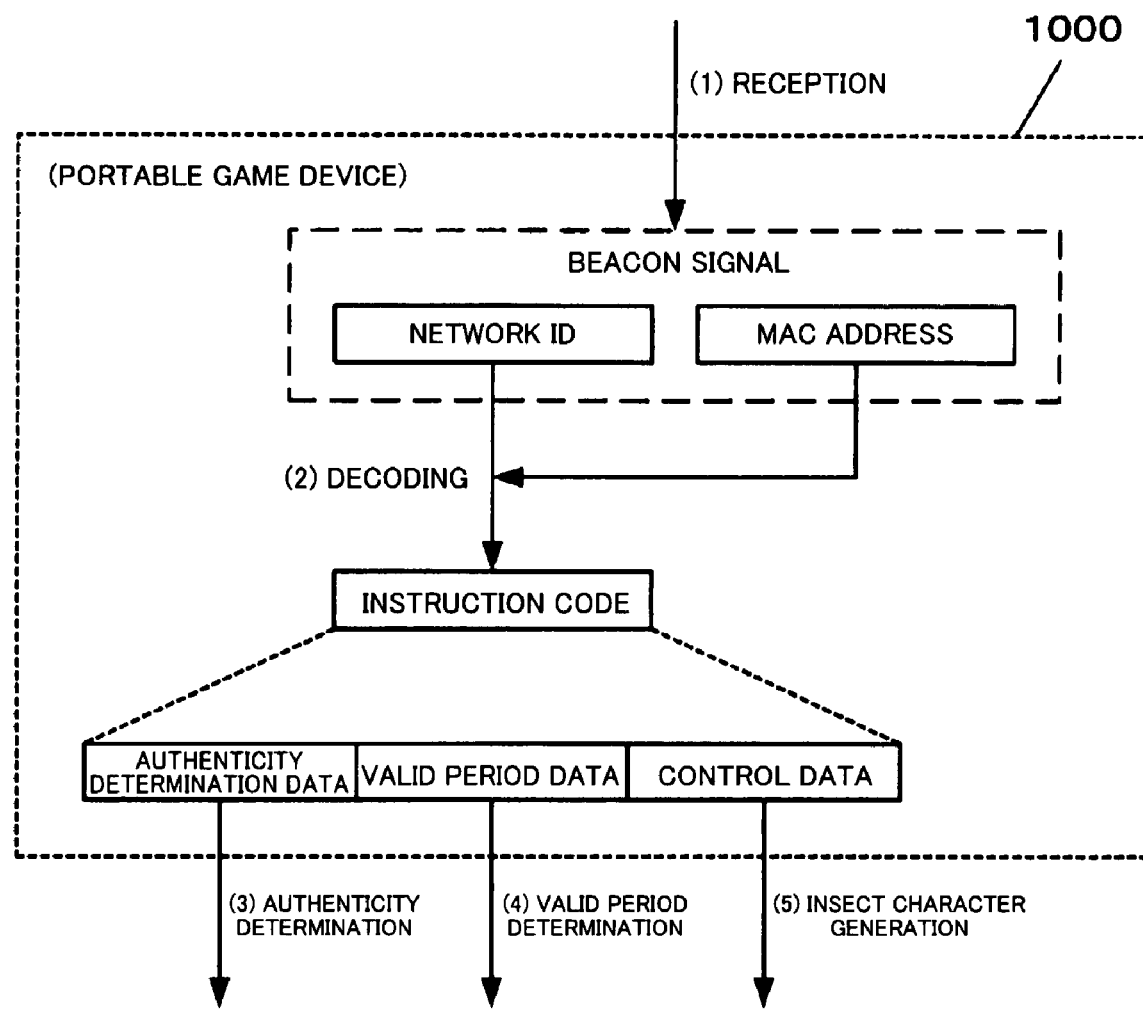

[INSECT CAGE LIST INFORMATION]

[COLLECTION LIST INFORMATION]

FIG. 14

| INSECT TYPE | MAC ADDRESS | GENERATION DATE | GROWTH LEVEL |
|---|---|---|---|
| ROBUST CICADA | XXXXXXXX | 2005/07/02 14:23 | |
| SMALL WHITE BUTTERFLY | XXXXXXXX | 2005/7/02 17:19 | |
| ⸺ | ⸺ | ⸺ | ⸺ |

[INSECT CAGE LIST INFORMATION]

FIG. 15

| INSECT TYPE | MAC ADDRESS | GENERATION DATE | GROWTH LEVEL |
|---|---|---|---|
| BLACK SWALLOW-TAILED BUTTERFLY | XXXXXXXX | 2005/07/01 11:58 | |
| JAPANESE FIREFLY | XXXXXXXX | 2005/07/01 15:32 | |
| ⸺ | ⸺ | ⸺ | ⸺ |

[COLLECTION LIST INFORMATION]

WIRELESS NETWORK SYSTEM, WIRELESS
COMMUNICATION INSTRUMENT,
WIRELESS COMMUNICATION
INSTRUMENT SETTING DEVICE, GAME
PROCESS CONTROL METHOD,
INFORMATION STORAGE MEDIUM, AND
PORTABLE ELECTRONIC INSTRUMENT

Japanese Patent Application No. 2006-92000 filed on Mar. 29, 2006 and Japanese Patent Application No. 2006-337989 filed on Dec. 15, 2006, are hereby incorporated by reference in their entirety.

BACKGROUND OF THE INVENTION

The present invention relates to a wireless network system including a wireless communication instrument which continually transmits an instrument ID and a network ID and a portable electronic instrument which can receive the instrument ID and the network ID transmitted from the wireless communication instrument and the like.

Along with wide-spread use of portable game devices provided with a wireless communication function, various games have been developed which acquire and utilize the current position of the player's device. For example, a game has been known which extracts the ID code of a base station which controls the current wireless area of the player's device from a signal transmitted from the base station, stores the ID code of the base station, and changes the game process utilizing the stored ID code of the base station (see JP-A-2001-96069, for example). The ID code of the base station is a value specific to each base station. For example, when utilizing a wireless LAN access point as the base station, the game device can identify the received ID code of the base station. For example, the terminal which has received the ID code can identify an BSSID or an ESSID which is the ID code of the base station. Therefore, an unfair action may be attempted in which the ID code received by one game device is analyzed, copied to, and utilized in another game device.

SUMMARY

According to one aspect of the invention, there is provided a wireless network system comprising:
a wireless communication instrument including an ID transmission section which continually transmits an instrument ID and a wireless network ID; and
a portable electronic instrument capable of receiving the instrument ID and the wireless network ID transmitted from the wireless communication instrument;
the wireless communication instrument including:
an instrument ID storage section which stores the instrument ID of the wireless communication instrument; and
a network ID storage section which stores, as the wireless network ID, data obtained by encoding data including at least specific authenticity determination data and given control data for controlling the portable electronic instrument so that the data can be decoded using the instrument ID stored in the instrument ID storage section, the ID transmission section transmitting the instrument ID stored in the instrument ID storage section and the wireless network ID stored in the network ID storage section; and
the portable electronic instrument including:
a reception section which receives the instrument ID and the wireless network ID transmitted from the ID transmission section;
a decoding section which decodes the received wireless network ID using the received instrument ID;
an authenticity determination section which determines whether or not the data decoded by the decoding section includes the same data as the specific authenticity determination data; and
a control section which executes control based on the control data included in the decoded data when the authenticity determination section has determined that the data decoded by the decoding section includes the same data as the specific authenticity determination data.

BRIEF DESCRIPTION OF THE SEVERAL VIEWS OF THE DRAWING

FIG. 3 shows examples of game screens of the portable game device.
FIG. 5 is a schematic view of the operation of the portable game device.
FIG. 14 shows a data configuration example of insect cage list information when changing a parameter of an insect character.
FIG. 15 shows a data configuration example of collection list information when changing a parameter of an insect character.

DETAILED DESCRIPTION OF THE EMBODIMENT

Figure 1:
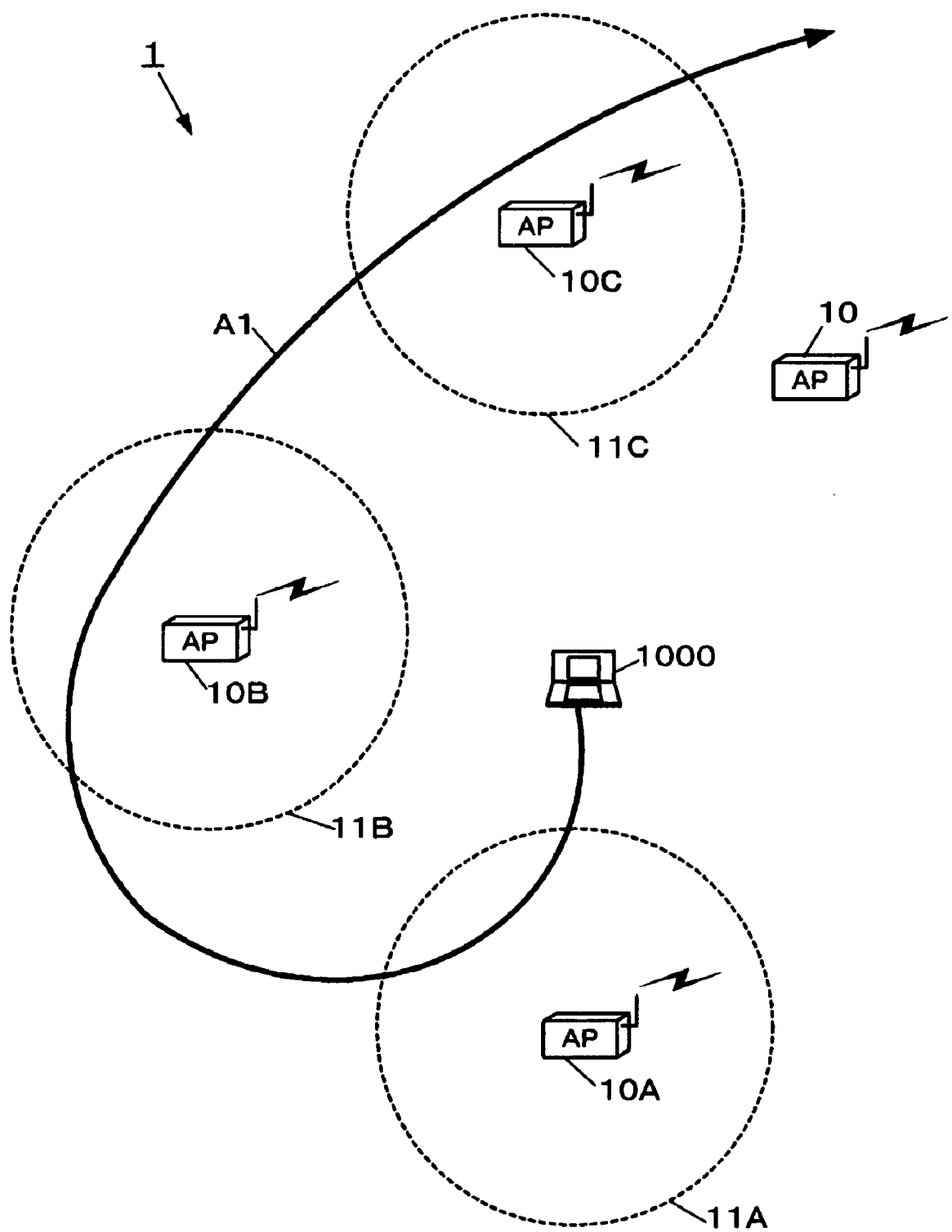
FIG. 1 is a schematic configuration view of a game system according to one embodiment of the invention.

The invention may prevent an unfair action in which an ID code received by one game device is copied to and utilized in another game device when proceeding with a game using the ID code received by the game device.

According to one embodiment of the invention, there is provided a wireless network system comprising:
a wireless communication instrument including an ID transmission section which continually transmits an instrument ID and a wireless network ID; and
a portable electronic instrument capable of receiving the instrument ID and the wireless network ID transmitted from the wireless communication instrument;
the wireless communication instrument including:
an instrument ID storage section which stores the instrument ID of the wireless communication instrument; and a network ID storage section which stores, as the wireless network ID, data obtained by encoding data including at least specific authenticity determination data and given control data for controlling the portable electronic instrument so that the data can be decoded using the instrument ID stored in the instrument ID storage section, the ID transmission section transmitting the instrument ID stored in the instrument ID storage section and the wireless network ID stored in the network ID storage section; and the portable electronic instrument including:

a reception section which receives the instrument ID and the wireless network ID transmitted from the ID transmission section;

a decoding section which decodes the received wireless network ID using the received instrument ID;

an authenticity determination section which determines whether or not the data decoded by the decoding section includes the same data as the specific authenticity determination data; and a control section which executes control based on the control data included in the decoded data when the authenticity determination section has determined that the data decoded by the decoding section includes the same data as the specific authenticity determination data.

According to another embodiment of the invention, there is provided a wireless communication instrument which continually transmits an instrument ID and a wireless network ID of the wireless communication instrument in order to perform wireless communication conforming to a specific communication standard with a portable electronic instrument which is located in a wireless communication area, the wireless communication instrument comprising:

an instrument ID storage section which stores the instrument ID of the wireless communication instrument;

a network ID storage section which stores data obtained by encoding given data so that the data can be decoded using the instrument ID stored in the instrument ID storage section as the wireless network ID; and a transmission section which transmits the instrument ID stored in the instrument ID storage section and the wireless network ID stored in the network ID storage section.

According to this configuration, in the wireless network system including the wireless communication instrument which continually transmits the instrument ID and the wireless network ID of the wireless communication instrument and the portable electronic instrument capable of receiving the instrument ID and the wireless network ID transmitted from the wireless communication instrument, the wireless communication instrument transmits data obtained by encoding data including the authenticity determination data and the control data so that the data can be decoded using the instrument ID as the wireless network ID, and the portable electronic instrument decodes the received wireless network ID using the received instrument ID, and executes control based on the control data included in the decoded data when the portable electronic instrument has determined that the decoded data includes the same data as the specific authenticity determination data.

The data obtained by decoding the wireless network ID includes the same data as the authenticity determination data set in advance only when decoded using the instrument ID transmitted from the wireless communication instrument having the wireless network ID, and includes data differing from the authenticity determination data set in advance when decoded using an instrument ID transmitted from another wireless communication instrument. Therefore, since control based on the control data included in the decoded data is not executed when the data obtained by decoding the wireless network ID does not include the same data as the specific authenticity determination data, desired control is not executed even if a wireless network ID received by one portable electronic instrument is utilized in another portable electronic instrument. This prevents an unfair action in which the received wireless network ID is copied to and utilized in another portable electronic instrument.

In the wireless network system according to this embodiment, the network ID storage section of the wireless communication instrument may store data obtained by encoding data including at least the authenticity determination data, the control data, and period data indicating a valid period of control based on the control data so that the data can be decoded using the instrument ID as the wireless network ID;

the portable electronic instrument may include a period determination section which determines whether or not a present date is within the valid period indicated by the period data included in the data decoded by the decoding section; and the control section may not execute control based on the control data when the period determination section has determined that the present date is not within the valid period, and may execute control based on the control data when the period determination section has determined that the present date is within the valid period and the authenticity determination section has determined that the data decoded by the decoding section includes the same data as the specific authenticity determination data.

According to this configuration, the wireless communication instrument stores data obtained by encoding data including at least the authenticity determination data, the control data, and the period data indicating the valid period of control based on the control data so that the data can be decoded using the instrument ID as the wireless network ID, and the portable electronic instrument does not execute control based on the control data when the portable electronic instrument has determined that the present date is not within the valid period, and executes control based on the control data when the portable electronic instrument has determined that the present date is within the valid period and the decoded data includes the same data as the specific authenticity determination data. This enables the valid period to be provided for control based on the control data executed in the portable electronic instrument.

According to a further aspect of the invention, there is provided a wireless communication instrument setting device which stores a wireless network ID in the wireless communication instrument as defined in claim 3, comprising:

an encoding section which encodes given data so that the data can be decoded using an instrument ID set for the wireless communication instrument in advance; and a network ID storage control section which stores the data encoded by the encoding section in the wireless communication instrument as the wireless network ID.

According to this configuration, the wireless communication instrument setting device encodes given data so that the data can be decoded using the instrument ID set for the wireless communication instrument in advance, and stores the encoded data in the wireless communication instrument as the wireless network ID. This enables the wireless network ID transmitted from one of the wireless communication instruments installed in various places in a town to be changed at an arbitrary timing. Therefore, control based on the control data executed in the portable electronic instrument can be changed at an arbitrary timing.

According to still another aspect of the invention, there is provided a game process control method for execution by a portable computer capable of performing wireless communication conforming to a specific communication standard, the method comprising:

a reception step of receiving encoded data obtained by encoding data including at least 1) an instrument ID and 2) specific authenticity determination data and given control data so that the data can be decoded using the instrument ID, the encoded data being transmitted from another communication instrument which is located in a present wireless communication area and performs wireless communication conforming to the communication standard;

a decoding step of decoding the received encoded data using the received instrument ID;

an authenticity determination step of determining whether or not the data decoded in the decoding step includes the same data as the specific authenticity determination data; and a game process control step of controlling the game process based on the control data included in the decoded data when the data decoded in the decoding step has been determined to include the same data as the specific authenticity determination data in the authenticity determination step.

According to a still further aspect of the invention, there is provided a portable electronic instrument which can perform wireless communication conforming to a specific communication standard and executes a specific game while controlling a game process, the portable electronic instrument comprising:

a reception section which receives encoded data obtained by encoding data including at least 1) an instrument ID and 2) specific authenticity determination data and given control data so that the data can be decoded using the instrument ID, the encoded data being transmitted from another communication instrument which is located in a present wireless communication area and performs wireless communication conforming to the communication standard;

a decoding section which decodes the received encoded data using the received instrument ID;

an authenticity determination section which determines whether or not the data decoded by the decoding section includes the same data as the specific authenticity determination data; and a game process control section which controls the game process based on the control data included in the decoded data when the authenticity determination section has determined that the data decoded by the decoding section includes the same data as the specific authenticity determination data.

According to this configuration, the portable electronic instrument which executes a specific game while controlling the game process receives the encoded data obtained by encoding data including 1) the instrument ID and 2) the authenticity determination data and the control data so that the data can be decoded using the instrument ID and transmitted from another communication instrument which is located in the present wireless communication area and performs wireless communication conforming to the communication standard, decodes the received encoded data using the received instrument ID, and controls the game process based on the control data included in the decoded data when the portable electronic instrument has determined that the decoded data includes the same data as the specific authenticity determination data.

The data obtained by decoding the wireless network ID includes the same data as the authenticity determination data set in advance only when decoded using the instrument ID transmitted from the wireless communication instrument having the wireless network ID, and includes data differing from the authenticity determination data set in advance when decoded using an instrument ID transmitted from another wireless communication instrument. Therefore, since control based on the control data included in the decoded data is not executed when the data obtained by decoding the wireless network ID does not include the same data as the specific authenticity determination data, control based on the control data included in the decoded data is not executed even if a wireless network ID received by one portable electronic instrument is utilized in another portable electronic instrument. This prevents an unfair action in which the received wireless network ID is copied to and utilized in another portable electronic instrument.

In the game process control method according to this embodiment, the wireless network ID may be data obtained by encoding data including at least the authenticity determination data, the control data, and period data indicating a valid period of control based on the control data so that the data can be decoded using the instrument ID;

the method may further include a period determination step of determining whether or not a present date is within the valid period indicated by the period data included in the data decoded in the decoding step; and the game process control step may not control the game process based on the control data when it has been determined that the present date is not within the valid period in the period determination step, and may control the game process based on the control data when it has been determined that the present date is within the valid period in the period determination step and it has been determined that the data decoded in the decoding step includes the same data as the specific authenticity determination data in the authenticity determination step.

According to this configuration, the wireless network ID is data obtained by encoding data including at least the authenticity determination data, the control data, and the period data indicating the valid period of control based on the control data so that the data can be decoded using the instrument ID, and control based on the control data is executed when it has been determined that the present date is within the valid period indicated by the period data included in the decoded data and the decoded data includes the same data as the specific authenticity determination data. This enables the valid period to be provided for control based on the control data executed in the portable electronic instrument.

In the game process control method according to this embodiment, the game process control step may include a new character generation step of generating a new character based on the control data.

According to this configuration, a new character is generated based on the control data. For example, a new character corresponding to the received wireless network ID is generated during the game.

In the game process control method according to this embodiment, the game process control step may include a parameter change step of changing a specific parameter value set for a character appearing in the game based on the control data.

According to this configuration, the parameter value set for a character appearing in the game is changed based on the control data.

According to yet another embodiment of the invention, there is provided a computer-readable information recording medium storing a program for causing a computer to execute one of the above described game process control methods.

The term "information storage medium" used herein refers to a storage medium, such as a hard disk, an MO, a CD-ROM, a DVD, a memory card, or an IC memory, from which the stored information can be read by a computer.

According to the invention, the portable electronic instrument decodes the received wireless network ID using the received instrument ID, and executes control based on the control data included in the decoded data when the portable electronic instrument has determined that the decoded data includes the same data as the specific authenticity determination data. Therefore, since control based on the control data included in the decoded data is not executed when the data obtained by decoding wireless network ID does not include the same data as the specific authenticity determination data, desired control is not executed even if a wireless network ID received by one portable electronic instrument is utilized in another portable electronic instrument. This prevents an unfair action in which the received wireless network ID is copied to and utilized in another portable electronic instrument.

Preferred embodiments of the invention are described below with reference to the drawings. The following description illustrates the case of executing an insect collecting game using a portable game device. Note that the embodiment to which the invention can be applied is not limited thereto.

<Game System>

FIG. 1 is a view showing a schematic configuration of a game system 1 according to this embodiment. As shown in FIG. 1, the game system 1 includes a wireless LAN access point (AP) instrument 10 and a portable game device 1000 capable of performing wireless communication conforming to a wireless LAN standard.

The AP instrument 10 is one of wireless communication instruments provided in various places in a town for wireless LAN connection, and periodically transmits a beacon signal. The beacon signal is a signal for informing a terminal instrument such as the portable game device 1000 located within the communication area of the AP instrument 10 of the presence of the AP instrument 10. The beacon signal includes a basic service set identifier (BSSID) and an extended service set identifier (ESSID) which are identifiers for identifying a network.

The portable game device 1000 is a small electronic instrument (portable electronic instrument) carried by a player, and can perform wireless communication conforming to a wireless LAN standard with the AP instrument 10. The portable game device 1000 executes an insect collecting game in which a player enjoys collecting insect characters by performing wireless communication with the AP instrument 10. In the insect collecting game, when the portable game device 1000 has received a beacon signal transmitted from the AP instrument 10, an insect character is generated based on data included in the received beacon signal.

For example, in the case where the portable game device 1000 is moved along a path indicated by an arrow A1 along with movement of the player, when the portable game device 1000 has been moved into a communication area 11A of an AP instrument 10A and has received a beacon signal transmitted from the AP instrument 10A, an insect character based on the received beacon signal is generated. When the portable game device 1000 has been moved into a communication area 11B of an AP instrument 10B and has received a beacon signal transmitted from the AP instrument 10B, an insect character based on the received beacon signal is generated. When the portable game device 1000 has been moved into a communication area 11C of an AP instrument 10C and has received a beacon signal transmitted from the AP instrument 10C, an insect character based on the received beacon signal is generated.

The data included in the beacon signal differs between each AP instrument 10 which is the sender of the beacon signal. Therefore, the insect character to be generated differs between each AP instrument 10 which is the sender of the received beacon signal. Only one insect character is generated based on the beacon signal transmitted from a single AP instrument 10.

Figure 2:
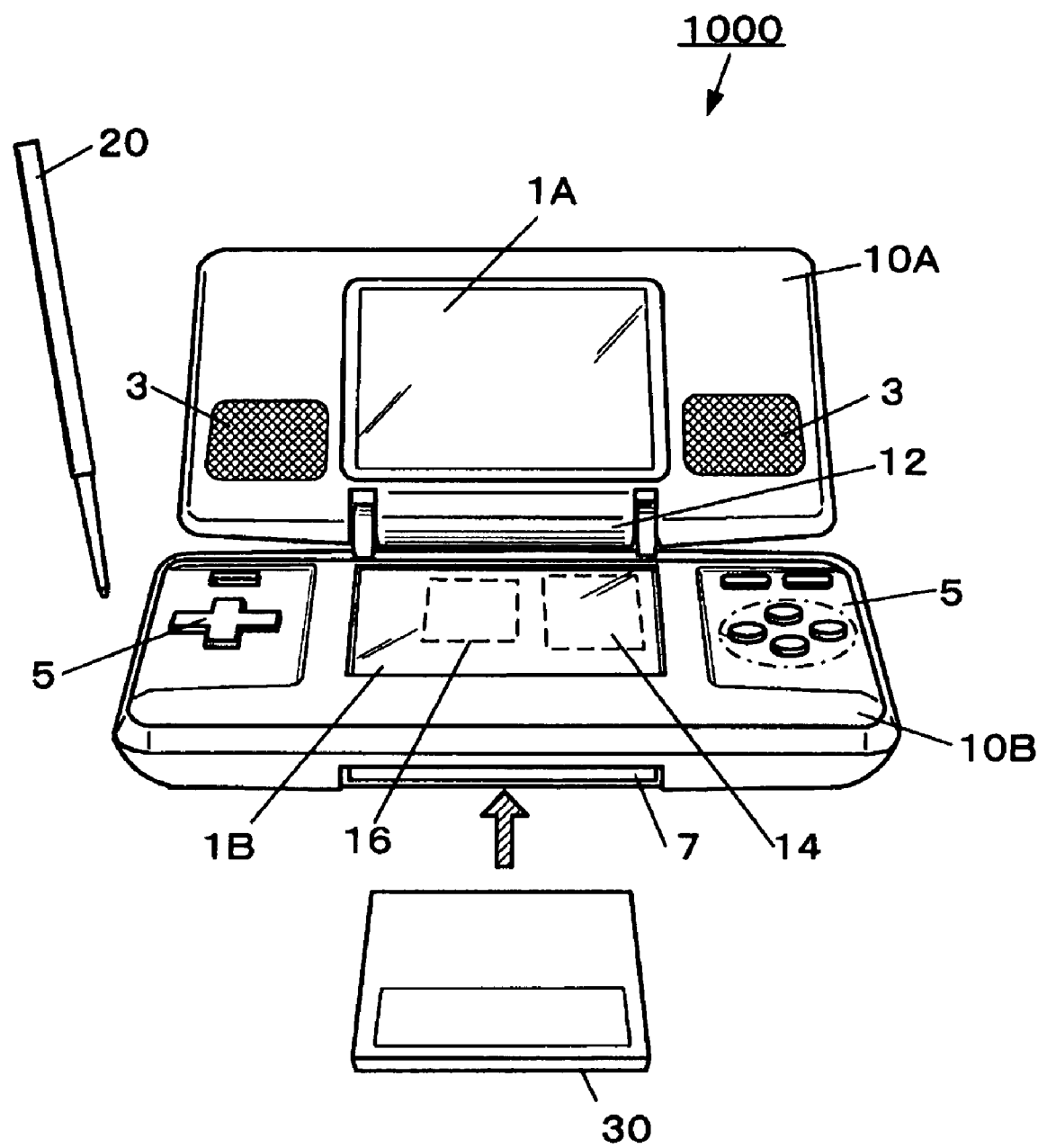
FIG. 2 shows an example of the outward appearance of a portable game device.

FIG. 2 is a view showing an example of the outward appearance of the portable game device 1000. As shown in FIG. 2, the portable game device 1000 is a folding-type game device in which an upper housing 10A and a lower housing 10B are connected through a hinge 12 so that the portable game device 1000 can be opened and shut. FIG. 2 illustrates the portable game device 1000 in an open state (during use).

Two displays 1A and 1B which are arranged on either side of the hinge 12 during use, a speaker 3, various operation buttons 5, and the like are provided on the inner surfaces of the housings 10A and 10B. A touch panel 110 is integrally formed in the display 1B over the entire display region. The touch panel 110 detects a touch position in units of dots forming the display 1B according to a detection principle such as a pressure-sensitive method, an optical method, an electrostatic method, or an electromagnetic induction method. A player can input various operations by utilizing a stylus pen 20 provided as an accessory or by touching the display 11B.

Game information including a program and data necessary for the portable game device 1000 to execute a game process and the like is stored in a cartridge 30 removable from a slot 7 formed in the side surface of the housing 10B. Note that the portable game device 1000 may connect with a wireless communication channel through a built-in wireless communication device 16 and acquires the game information from an external instrument.

The portable game device 1000 includes a control unit 14 including a CPU and an IC memory, the wireless communication device 16 for performing wireless communication conforming to a wireless LAN standard, a reading device for the cartridge 30, and the like. The CPU provided in the control unit 14 executes various game processes based on a program and data read from the IC memory or the cartridge 30, a touch position detected by the touch panel 110, an operation signal input using the operation button 5, data received by the wireless communication device 16, and the like, and generates an image signal of a game screen and a sound signal of game sound. The CPU outputs the generated image signal to the displays 1A and 1B to cause the displays 1A and 11B to display a game screen, and outputs the generated sound signal to the speaker 3 to cause the speaker 3 to output game sound. A player enjoys the insect collecting game by operating the operation button 5 or touching the display 1B while watching the game screens displayed on the displays 1A and 1B.

FIG. 3 shows examples of the game screens displayed on the displays 1A and 1B of the portable game device 1000. The upper part shows the screen displayed on the display 1A, and the lower part shows the screen displayed on the display 1B.

As shown in FIG. 3, a collection screen W10 is displayed on the display 1A, and an insect cage screen W20 is displayed on the display 1B. A video image of insect characters (insect characters C21, C23, C25, C27, and C29 in FIG. 3) generated upon reception of a beacon signal is displayed on the insect cage screen W20. A still image of insect characters (insect characters C11 and C13 in FIG. 3) generated upon reception of a beacon signal and added to the collection by a player's specific collection operation is displayed on the collection screen W10.

In more detail, when the player has designated an insect character by touching the insect cage screen W20 and has slid the insect character upward (direction indicated by arrow A21) on the screen (collection operation), the designated insect character is added to the collection. When the player has designated an insect character by touching the insect cage screen W20 and has slid the insect character downward (direction indicated by arrow A23) on the screen (discard operation), the designated insect character is discarded from the insect cage.

Figure 4A:
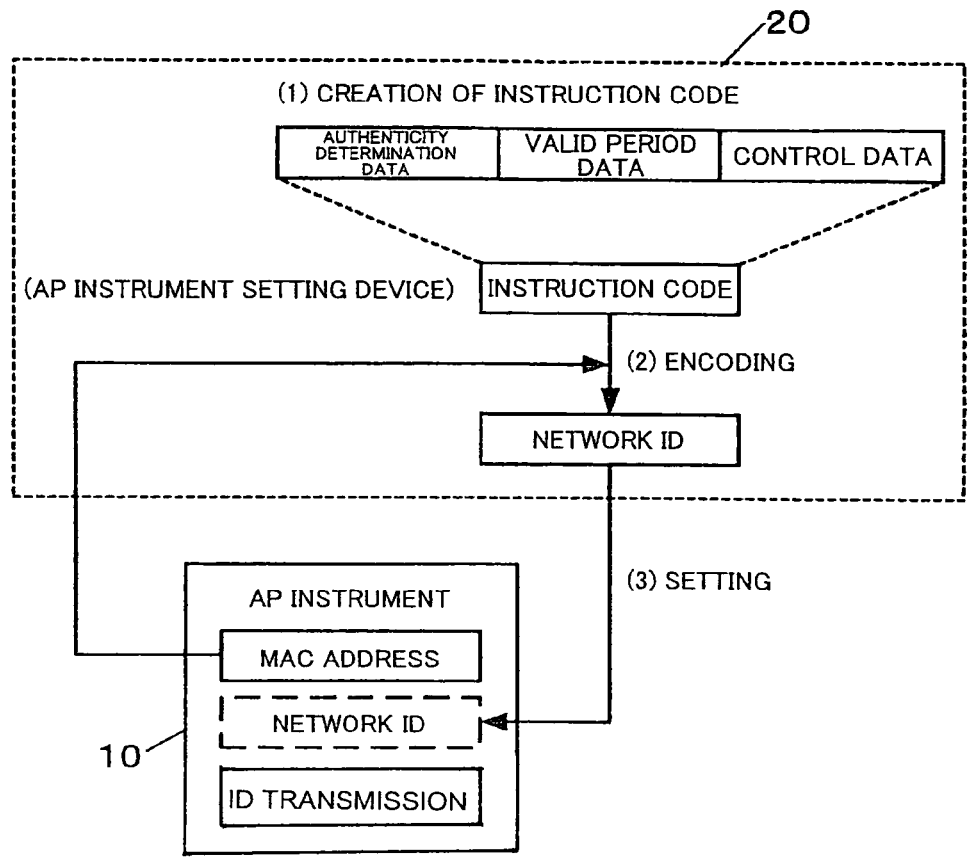
FIGS. 4A and 4B are schematic views of the operation of an AP instrument setting device.
Figure 4B:
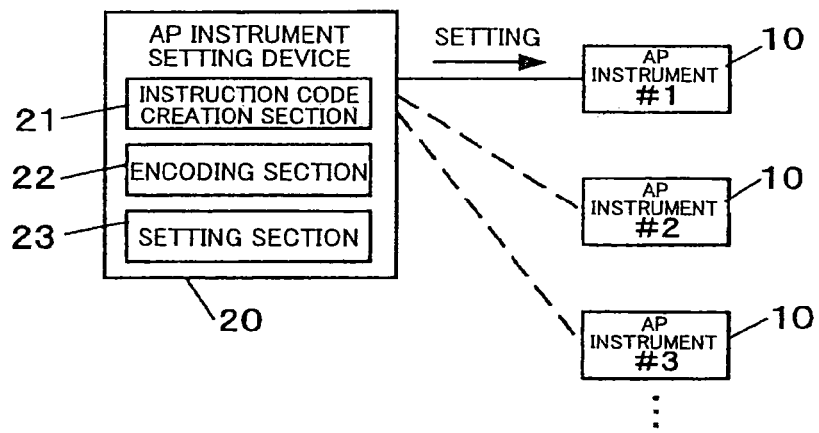

A beacon signal transmitted from the AP instrument 10 includes (1) a media access control (MAC) address and (2) a network ID. The MAC address is the instrument ID of the AP instrument 10 and is transmitted as a BSSID. The network ID is data (encoded data) obtained by encoding an instruction code for the portable game device 1000 by a specific method so that the network ID can be decoded using the MAC address of the AP instrument 10, and is transmitted as an ESSID which is a wireless LAN network identifier (wireless network ID). As shown in FIGS. 4A and 4B, the network ID is set and stored in advance by an AP instrument setting device 20.

FIGS. 4A and 4B are views showing a schematic operation of the AP instrument setting device 20. As shown in FIG. 4A, the AP instrument setting device 20 creates an instruction code for the target AP instrument 10. The instruction code includes authenticity determination data, valid period data, and control data. The authenticity determination data is data for determining whether or not the decoded network ID is valid data. For example, a specific character string with a specific length is set as the authenticity determination data. The valid period data is data indicating the valid period of control based on the control data. For example, the start date and the end date of the valid period are set as the valid period data. The control data is data for controlling generation of an insect character in the portable game device 1000. In this embodiment, the insect type of an insect character generated is set as the control data.

The AP instrument setting device 20 encodes the created instruction code by a specific method so that the instruction code can be decoded using the MAC address of the target AP instrument 10 to create a network ID. The AP instrument setting device 20 sets (stores) the generated network ID in the target AP instrument 10. The AP instrument 10 transmits a beacon signal including the MAC address and the network ID set and stored in the AP instrument 10.

The AP instrument setting device 20 is formed of a computer system such as a personal computer. As shown in FIG. 4B, the AP instrument setting device 20 sequentially connects with each of a number of AP instruments 10 via a communication channel and sets the instrument ID and the network ID in each AP instrument 10. The AP instrument setting device 20 includes an instruction code creation section 21, an encoding section 22, and a setting section 23. The instruction code creation section 21 creates an instruction code for the target AP instrument 10. The encoding section 22 encodes the instruction code created by the instruction code creation section 21 by a specific method so that the instruction code can be decoded using the instrument ID of the target AP instrument 10. The setting section 23 communicates with the target AP instrument 10, transmits the data encoded by the encoding section 22 to the target AP instrument 10, and sets the data in the target AP instrument 10 as the network ID.

FIG. 5 is a view showing a schematic operation of the portable game device 1000 which has received a beacon signal. As shown in FIG. 5, when the portable game device 1000 has received a beacon signal transmitted from the AP instrument 10, the portable game device 1000 extracts the MAC address and the network ID from the received beacon signal. The portable game device 1000 decodes the extracted network ID using the extracted MAC address to obtain the instruction code (original data). The portable game device 1000 determines whether or not the authenticity determination data included in the decoded instruction code coincides with specific authenticity determination data set in advance. When the portable game device 1000 has determined that the authenticity determination data coincides with specific authenticity determination data, the portable game device 1000 determines whether or not the present date is within a valid period indicated by the valid period data included in the decoded instruction code. When the portable game device 1000 has determined that the present date is within the valid period, the portable game device 1000 generates an insect character based on the control data included in the decoded instruction code.

<Functional Configuration>

Figure 6:
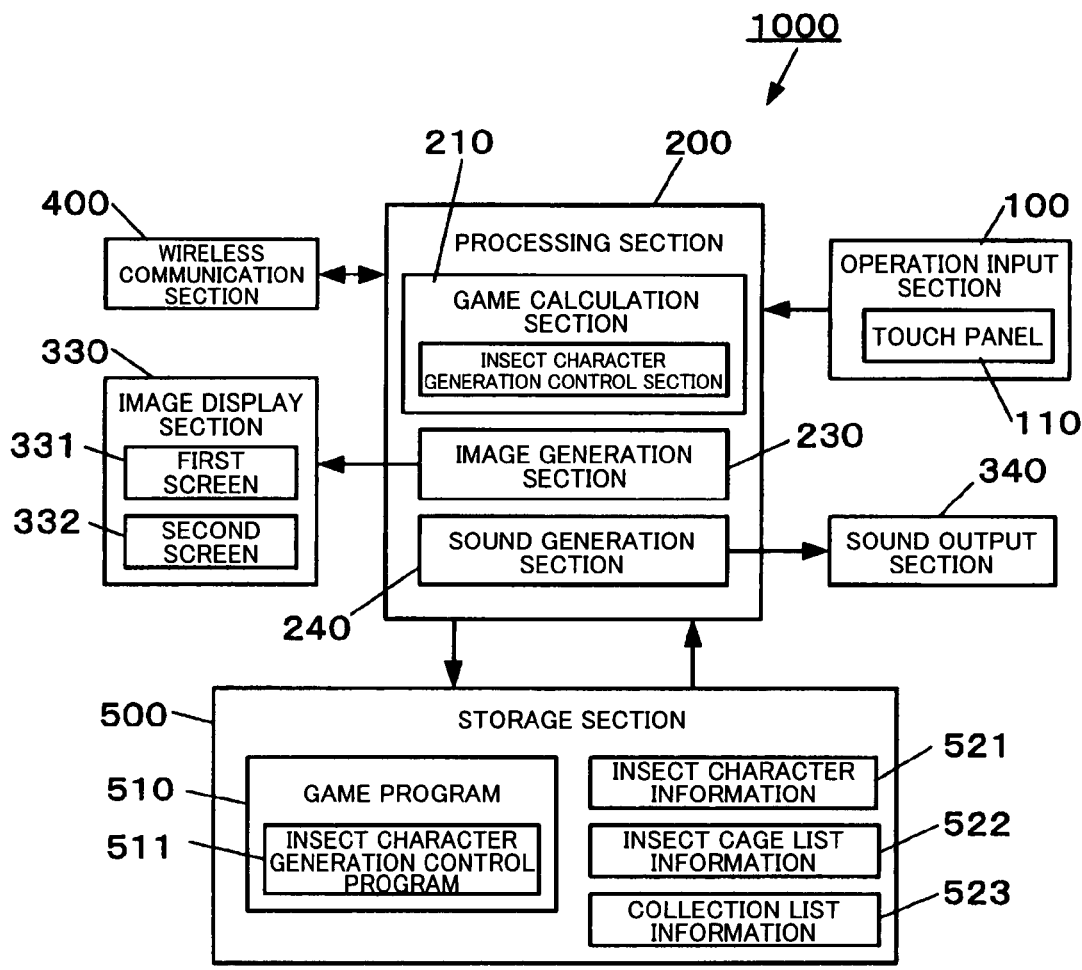
FIG. 6 is a functional configuration view of the portable game device.

FIG. 6 is a view showing an example of the functional configuration of the portable game device 1000. As shown in FIG. 6, the portable game device 1000 functionally includes an operation input section 100, a processing section 200, an image display section 330, a sound output section 340, a wireless communication section 400, and a storage section 500.

The operation input section 100 receives an operation instruction input from the player, and outputs an operation signal corresponding to the operation to the processing section 200. The operation input section 100 includes the touch panel 110, and outputs the detected touch position on a second screen 332 to the processing section 200. The function of the operation input section 100 is implemented by a button switch, a lever, a dial, a mouse, a keyboard, various sensors, a touch panel, and the like. In FIG. 2, the operation button 5 and the touch panel integrally formed in the display 1B correspond to the operation input section 100.

The processing section 200 controls the entire portable game device 1000 and executes various calculations for proceeding with the game and generating an image. The function of the processing section 200 is implemented by a calculation device such as a CPU (CISC or RISC) or an ASIC (e.g. gate array) and its control program, for example. In FIG. 2, the CPU mounted on the control unit 14 corresponds to the processing section 200.

The processing section 200 includes a game calculation section 210 which mainly executes game calculations, an image generation section 230 which generates an image of a virtual three-dimensional space (game space) viewed from a given view point such as a virtual camera based on various types of data calculated by the game calculation section 210, and a sound generation section 240 which generates game sound such as effect sound and background music (BGM).

The game calculation section 210 executes various game processes based on the operation signal input from the operation input section 100, reception data input from the wireless communication section 400, a program and data read from the storage section 500, and the like. The game processes include setting a game space by disposing various objects in the virtual three-dimensional space, controlling a player's character based on the operation signal from the operation input section 100, determining a hit between objects (hit check), controlling the view point (virtual camera), and the like.

In this embodiment, the game calculation section 210 includes an insect character generation control section 211.

The insect character generation control section 211 controls generation of an insect character based on a beacon signal transmitted from the AP instrument 10 and received by the portable game device 1000. In more detail, the insect character generation control section 211 extracts the MAC address and the network ID from the received beacon signal, and decodes the extracted network ID using the extracted MAC address to obtain the instruction code (original data).

The insect character generation control section 211 determines whether or not the authenticity determination data included in the decoded instruction code coincides with specific authenticity determination data set in advance. When the insect character generation control section 211 has determined that the authenticity determination data coincides with specific authenticity determination data, the insect character generation control section 211 determines that the decoded instruction code is valid data. When the insect character generation control section 211 has determined that the authenticity determination data does not coincide with specific authenticity determination data, the insect character generation control section 211 determines that the decoded instruction code is not valid data. When the insect character generation control section 211 has determined that the decoded instruction code is valid data, the insect character generation control section 211 determines whether or not the present date is within a valid period indicated by the valid period data included in the decoded instruction code. When the insect character generation control section 211 has determined that the present date is within the valid period, the insect character generation control section 211 determines whether or not to generate an insect character of the insect type indicated by the control data included in the decoded instruction code. Specifically, the insect character generation control section 211 determines whether or not data of a combination of the MAC address included in the decoded instruction code and the insect type indicated by the control data included in the decoded instruction code is stored in insect cage list information 522 or collection list information 523. When the insect character generation control section 211 has determined that the data is not stored, the insect character generation control section 211 determines that the insect character should be generated. When the insect character generation control section 211 has determined that the data is stored, the insect character generation control section 211 determines that the insect character should not be generated.

When the insect character generation control section 211 has determined that the insect character should be generated, the insect character generation control section 211 adds the insect type indicated by the control data, the MAC address included in the decoded instruction code, and the present time to the insect cage list information 522 while associating the insect type, the MAC address, and the present time, and causes the insect character to be displayed on the insect cage screen W20 referring to the insect character information 521.

Figure 8:
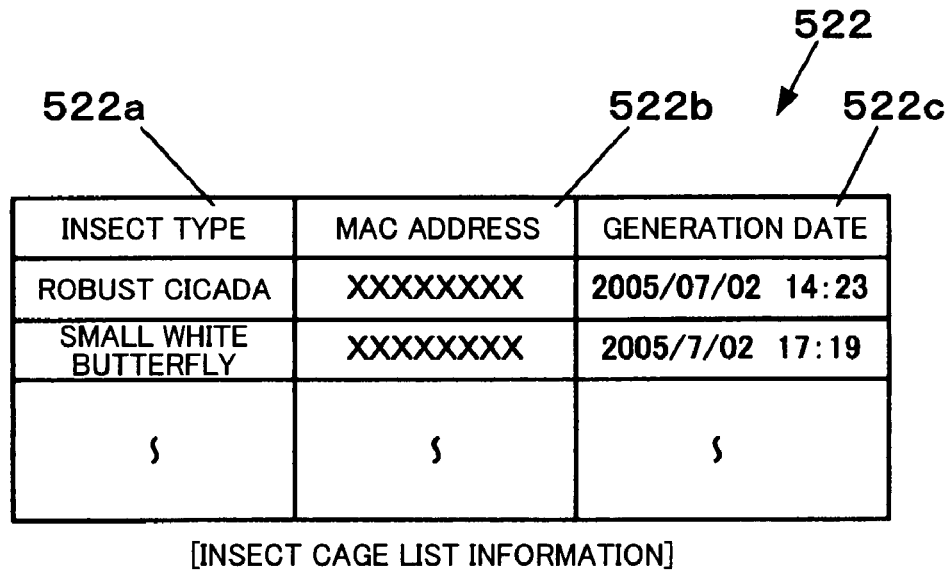
FIG. 8 shows a data configuration example of insect cage list information.

The insect cage list information 522 is data of an insect character kept in the insect cage (i.e. insect character generated by the insect character generation control section 211), is not added to the collection, and is not discarded. FIG. 8 is a view showing an example of a data configuration of the insect cage list information 522. As shown in FIG. 8, an insect type 522a, a MAC address 522b, and a generation date 522c are associated and stored in the insect cage list information 522 for each insect character kept in the insect cage. The MAC address of the beacon signal which has caused the insect character to be generated is stored as the MAC address 522b. The generation date 522c indicates the date on which the insect character was generated.

Figure 9:
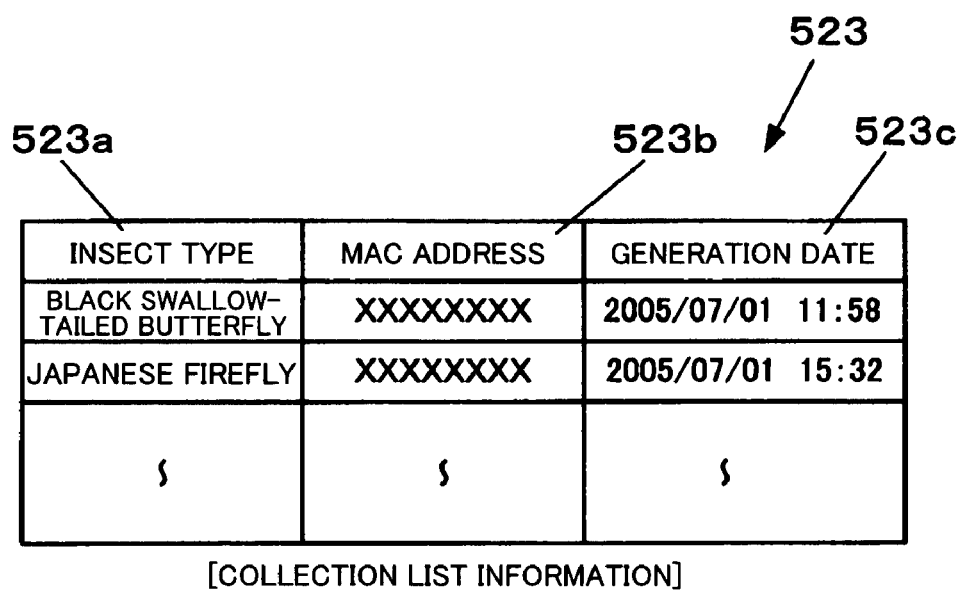
FIG. 9 shows a data configuration example of collection list information.

The collection list information 523 is data of an insect character added to the collection. FIG. 9 shows an example of a data configuration of the collection list information 523. As shown in FIG. 9, an insect type 523a, a MAC address 523b, and a generation date 523c are associated and stored in the collection list information 523 for each insect character added to the collection.

When the player has performed the collection operation on the insect cage screen W20, the data of the insect character designated by the collection operation is deleted from the insect cage list information 522, and the data of the designated insect character is added to the collection list information 523. When the player has performed the discard operation on the insect cage screen W20, the data of the insect character designated by the discard operation is deleted from the insect cage list information 522.

Figure 7:
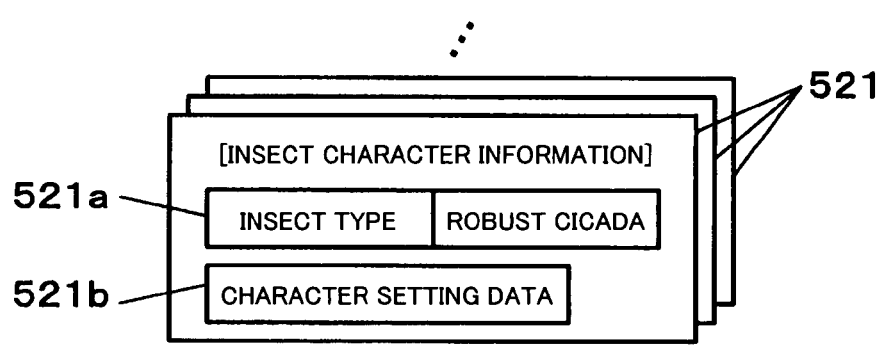
FIG. 7 shows a data configuration example of insect character information.

The insect character information 521 is data of an insect character which can be generated. FIG. 7 shows an example of a data configuration of the insect character information 521. As shown in FIG. 7, the insect character information 521 is provided for each type of insect character, and includes an insect type 521a and setting data 521b. The name of the insect character is stored as the insect type 521a. The setting data 521b is image data for displaying a video image or a still image of the insect character and sound data of its song and the like.

The image generation section 230 generates a game image (3D CG image or 2D CG image) for displaying a game screen based on the calculation results from the game calculation section 210, and outputs an image signal of the generated image to the image display section 330.

The image display section 330 includes a first screen 331 and a second screen 332, and displays a game screen based on the image signal from the image generation section 230 while redrawing the screen by one frame every 1/60 second, for example. The function of the image display section 330 is implemented by hardware such as a CRT, an LCD, an ELD, a PDP, or an HMD. In FIG. 2, the display 1A corresponds to the first screen 331, and the display 1B corresponds to the second screen 332.

The sound generation section 240 generates game sound such as effect sound and BGM used during the game, and outputs a sound signal of the generated game sound to the sound output section 340. The sound output section 340 outputs the game sound such as effect sound and BGM based on the sound signal from the sound generation section 240. The function of the sound output section 340 is implemented by a speaker or the like. In FIG. 2, the speaker 3 corresponds to the sound output section 340.

The wireless communication section 400 connects with a specific wireless communication channel and performs data communication with an external instrument (mainly the AP instrument 10). The function of the wireless communication section 400 is implemented by a wireless communication module for performing wireless communication conforming to a wireless LAN standard.

The storage section 500 stores a system program for implementing each function for causing the processing section 200 to integrally control the portable game device 1000, a program and data necessary for causing the processing section 200 to execute the game, and the like. The storage section 500 is used as a work area for the processing section 200, and temporarily stores the results of calculations executed by the processing section 200 according to various programs, data input from the operation input section 100, and the like. The function of the storage section 500 is implemented by various IC memories, a hard disk, a CD-ROM, a DVD, an MO, a RAM, a VRAM, or the like. In FIG. 2, the IC memory mounted on the control unit 14 and the cartridge 30 correspond to the storage section 500.

The storage section 500 also stores a game program 510 for causing the processing section 200 to function as the game calculation section 210 and game data. The game data includes the insect character information 521, the insect cage list information 522, and the collection list information 523.

<Process Flow>

Figure 10:
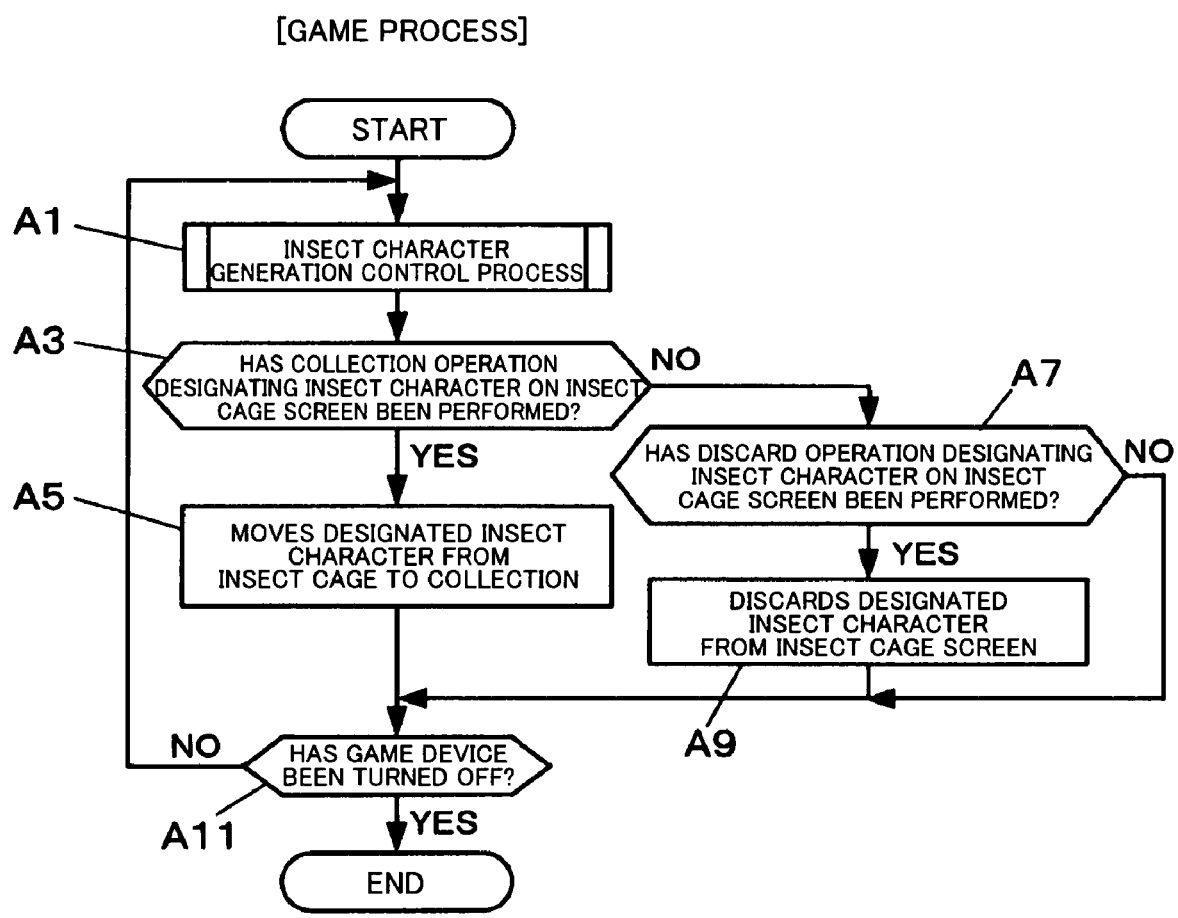
FIG. 10 is a flowchart of the flow of a game process.

FIG. 10 is a flowchart illustrative of the flow of a game process executed by the portable game device 1000. The game process is implemented by causing the game calculation section 210 to execute the game program 510. The game process starts when the portable game device 1000 is turned ON. As shown in FIG. 10, the insect character generation control section 211 executes an insect character generation control process (step A1).

Figure 11:
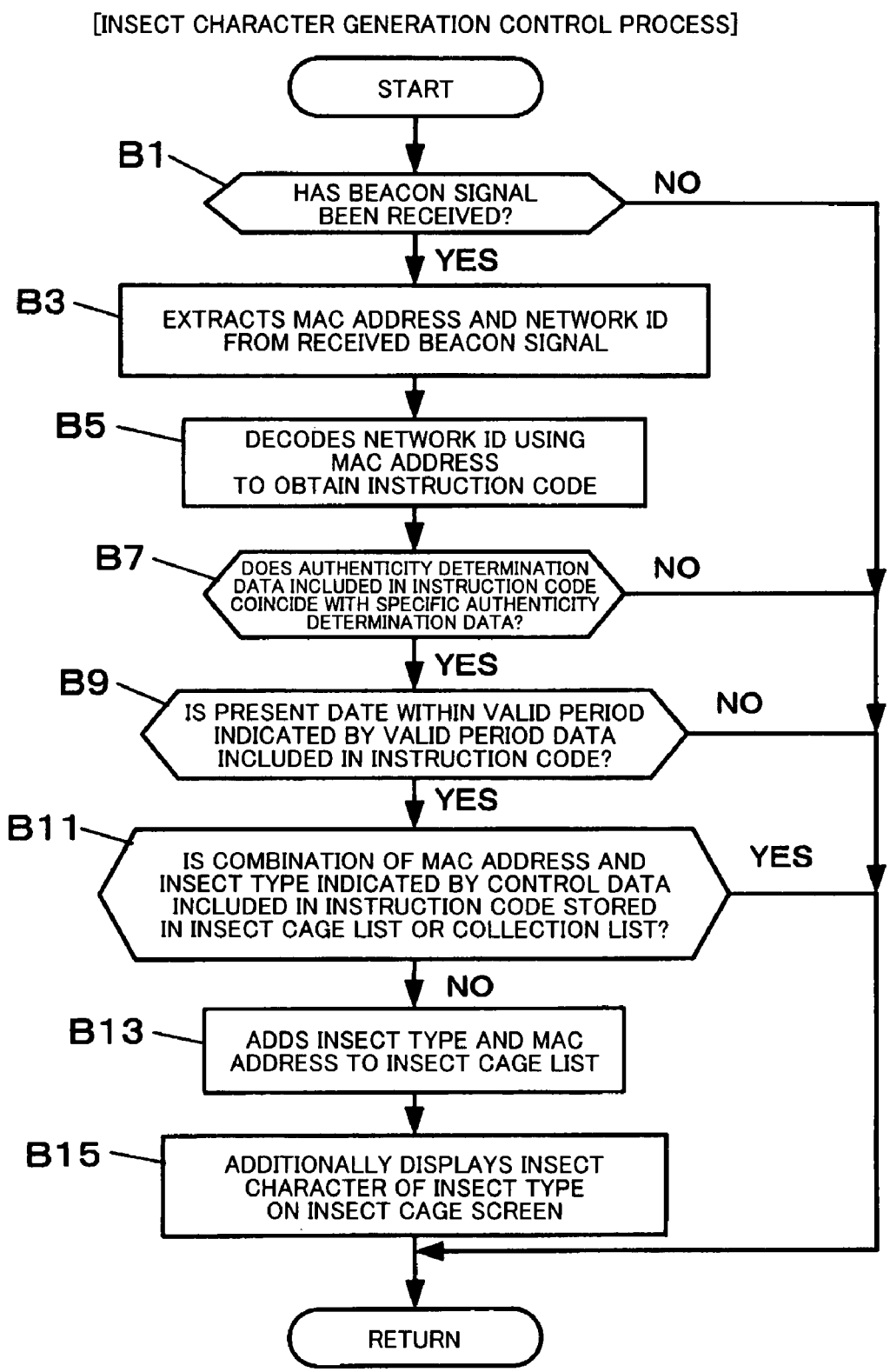
FIG. 11 is a flowchart of an insect character generation control process executed during the game process.

FIG. 11 is a flowchart illustrative of the flow of the insect character generation control process. As shown in FIG. 11, the insect character generation control section 211 determines whether or not the portable game device 1000 has received a beacon signal. When the insect character generation control section 211 has determined that the portable game device 1000 has received a beacon signal (step B1: YES), the insect character generation control section 211 extracts the MAC address and the network ID from the received beacon signal (step B3). The insect character generation control section 211 decodes the extracted network ID using the extracted MAC address to obtain the instruction code (original data) (step B5).

The insect character generation control section 211 determines whether or not the authenticity determination data included in the decoded instruction code coincides with specific authenticity determination data set in advance. When the insect character generation control section 211 has determined that the authenticity determination data coincides with specific authenticity determination data (step B7: YES), the insect character generation control section 211 determines whether or not the present date is within the valid period indicated by the valid period data included in the decoded instruction code. When the insect character generation control section 211 has determined that the present date is within the valid period (step B9: YES), the insect character generation control section 211 determines whether or not data of a combination of the decoded MAC address and the insect type indicated by the control data included in the decoded instruction code is stored in the insect cage list information 522 or the collection list information 523.

When the insect character generation control section 211 has determined that the data is not stored in the insect cage list information 522 and the collection list information 523 (step B11: NO), the insect character generation control section 211 adds the insect character of the insect type indicated by the control data to the insect cage. Specifically, the insect character generation control section 211 adds the insect type indicated by the control data, the MAC address, and the present time to the insect cage list information 522 while associating the insect type, the MAC address, and the present time (step B13), and causes the insect character of the insect type indicated by the control data to be additionally displayed on the insect cage screen W20 referring to the insect character information 521 (step B15).

When the above process has been completed, the insect character generation control section 211 finishes the insect character generation process.

When the insect character generation process has been completed, the game calculation section 210 determines whether or not the collection operation designating the insect character has been performed on the insect cage screen W20. When the game calculation section 210 has determined that the collection operation has been performed (step A3: YES), the game calculation section 210 adds the designated insect character to the collection from the insect cage. Specifically, the game calculation section 210 deletes the data of the designated insect character from the insect cage list information 522, adds the data to the collection list information 523, and moves the designated insect character from the insect cage screen W20 to the collection screen W10 (step A5).

The game calculation section 210 determines whether or not the discard operation designating the insect character has been performed on the insect cage screen W20. When the game calculation section 210 has determined that the discard operation has been performed (step A3: NO, step A7: YES), the game calculation section 210 discards the designated insect character from the insect cage. Specifically, the game calculation section 210 deletes the data of the designated insect character from the insect cage list information 522, and removes the designated insect character from the insect cage screen W20 (step A9).

The game calculation section 210 determines whether or not the portable game device 1000 has been turned OFF. When the game calculation section 210 has determined that the portable game device 1000 has not been turned OFF (step A11: NO), the game calculation section 210 returns to the step A1. When the game calculation section 210 has determined that the portable game device 1000 has been turned OFF (step A11: YES), the game calculation section 210 finishes the game process.

<Effects>

According to this embodiment, when the portable game device 1000 including a wireless communication function conforming to a wireless LAN standard has received a beacon signal transmitted from one of the wireless LAN AP instruments 20 provided in various places in a town, an insect character is generated based on the received beacon signal. The beacon signal transmitted from each AP instrument 10 includes the MAC address and the network ID. The network ID is data obtained by encoding the instruction code including the authenticity determination data, the valid period data, and the control data so that the network ID can be decoded using the MAC address of the AP instrument 20. The portable game device 1000 decodes the network ID included in the received beacon signal using the MAC address included in the beacon signal, and generates the insect character indicated by the control data included in the decoded instruction code only when the authenticity determination data included in the decoded instruction code coincides with the authenticity determination data set in advance and the present date is within the valid period indicated by the valid period data included in the decoded instruction code.

The authenticity determination data included in the instruction code obtained by decoding the network ID coincides with the authenticity determination data set in advance only when the network ID is decoded using the MAC address transmitted from the AP instrument 20 having the network ID, and does not coincide with the authenticity determination data set in advance when the network ID is decoded using the MAC address transmitted from another AP instrument 20. Specifically, even if a player intends to use the network ID included in the beacon signal received by one portable game device 1000 in another portable game device 1000, since correct authenticity determination data is not obtained as long as the network ID is decoded using the MAC address received together with the network ID, an insect character is not generated. Therefore, an unfair action is prevented in which the received network ID is copied to and utilized in another portable game device 1000.

Moreover, the AP instrument 10 can be installed and recovered with high degrees of freedom by setting the insect character generation valid period using the valid period data. Specifically, while the AP instrument 10 periodically transmits a beacon signal when powered, the portable game device 1000 which receives the beacon signal generates an insect character based on the control data only in the valid period set in the beacon signal. This ensures advantages in terms of business when the administrator of the game system 1 installs and recovers the AP instrument 10, such as installing the AP instrument 10 in a desired place and supplying power to the AP instrument 10 before the set valid period starts, or recovering the AP instrument 10 at any time after the valid period has elapsed.

<Modification>

The embodiments to which the invention can be applied are not limited to the above-described embodiments. Various modifications and variations may be made without departing from the spirit and scope of the invention.

(A) Control Data

In the above-described embodiments, the control data included in the instruction code indicates the insect type of the insect character generated. Note that the control data may be a command indicating control for the insect character kept in the insect cage or added to the collection, such as "chrysalis of a small white butterfly changes to adult" or "robust cicada dies". Specifically, the control data can also be utilized as a control program.

For example, a growth level indicating the degree of growth is set for the insect character as a parameter, and the value of the growth level of the generated insect character is increased (changed) to cause the insect character to be grown.

Figure 12:
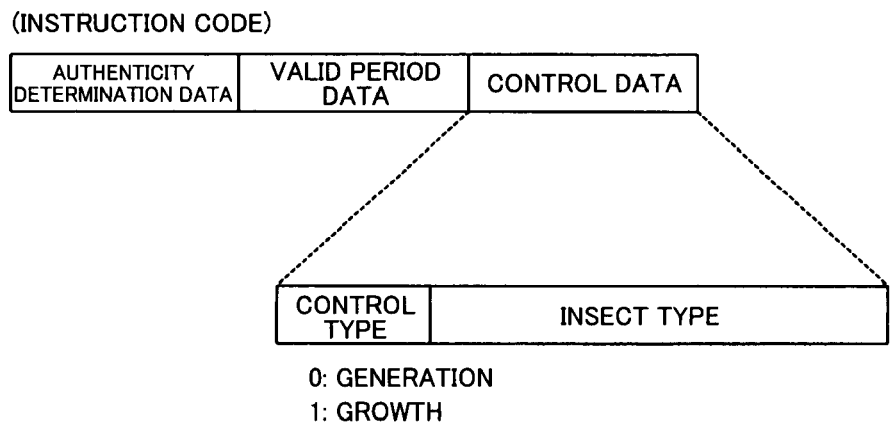
FIG. 12 shows a configuration example of an instruction code when changing a parameter of an insect character.

In more detail, a control type and an insect type are set as the control data included in the instruction code, as shown in FIG. 12. The control type is data indicating control for the AP instrument 10. In more detail, a value indicating (1) "generation" for generating an insect character or (2) "growth" for changing (increasing) the growth level of an insect character kept in the insect cage or added to the collection is set as the control type.

Figure 13:
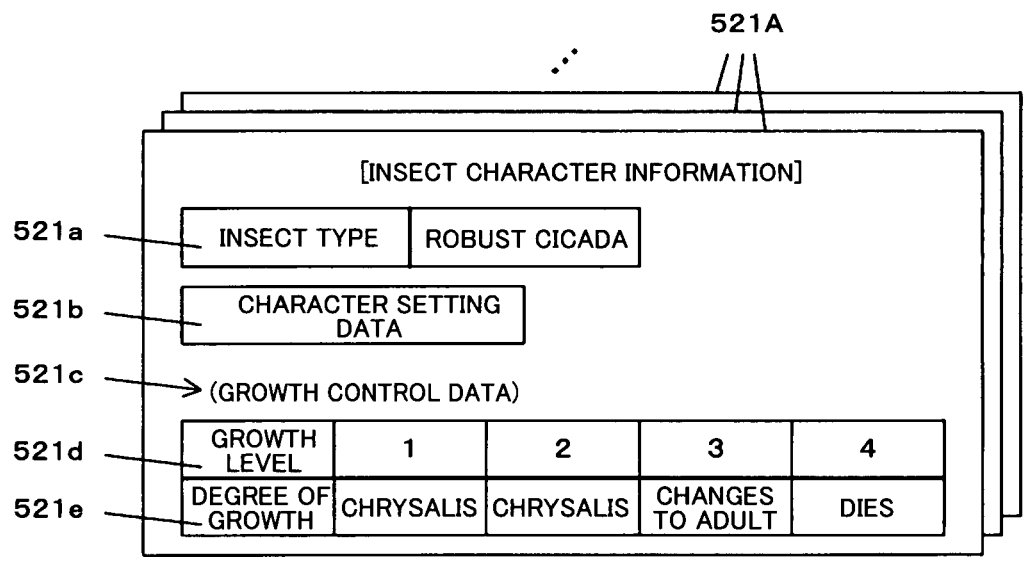
FIG. 13 shows a data configuration example of insect character information when changing a parameter of an insect character.

As shown in FIG. 13, growth control data 521*c* in which a degree of growth 521*e* of the character is associated with each growth level 521*d* is stored in the insect character information 521A, and image data of the insect character (e.g. image data of "chrysalis" or "cicada (adult)") corresponding to each degree of growth set by the growth control data 521*c* is stored in the character setting data 521*b*.

As shown in FIG. 14, a growth level 522*d* associated with each insect type 522*a* is stored in the insect cage list information 522A. As shown in FIG. 15, a growth level 523*d* associated with each insect type 523*a* is stored in the collection list information 523A.

The insect character generation control section 211 determines the control type of the control data included in the instruction code decoded from the received beacon signal, and executes a process corresponding to the determined control type. Specifically, when the control type is "generation", the insect character generation control section 211 determines whether or not the insect character exists in the insect cage or the collection referring to the insect cage list information 522A and the collection list information 523A in the same manner as in the above embodiment, and generates the insect character of the insect type indicated by the control data when the insect character does not exist. In this case, the insect character generation control section 211 sets the growth level of the insect character at the lowest level (e.g. "1"), and causes an image of the insect character corresponding to the set growth level to be displayed on the insect cage screen W20 referring to the insect character information 521A.

On the other hand, when the determined control type is "growth", the insect character generation control section 211 determines whether or not the insect character of the insect type exists in the insect cage or the collection, and increases the growth level of the insect character by one when the insect character exists. The insect character generation control section 211 updates the insect character displayed on the insect cage screen W20 or the collection screen W10 with an image corresponding to the updated growth level. Note that "growth" is not carried out (i.e. growth level is not updated) when the insect character does not exist in the insect cage and the collection.

(B) Encoding

In the above embodiment, the network ID is data obtained by encoding the instruction code so that the network ID can be decoded using the MAC address. Note that only the authenticity determination data included in the instruction code may be encoded. This is because the portable game device 1000 does not perform control (generation of insect character) based on the control data when the authenticity determination data included in the data obtained by decoding the network ID using the received MAC address does not coincide with specific authenticity determination data set in advance.

(C) Authenticity Determination

Authentication using a WEP key may be performed in addition to authenticity determination using the authenticity determination data used in the above embodiment. In more detail, the AP instrument setting device 20 sets a specific WEP key in the AP instrument 10 when setting the network ID. When the portable game device 1000 which has received a beacon signal has determined that the authenticity determination data included in the decoded instruction code coincides with specific authenticity determination data set in advance, the portable game device 1000 connects with the AP instrument 10 via a communication channel using a specific WEP key set in advance. The portable game device 1000 determines that the authenticity determination data is valid data only when the portable game device 1000 has successfully connected with the AP instrument 10, and generates the insect character based on the control data.

(D) Game to which the Invention is Applied

The above embodiment illustrates the case of executing an insect collecting game. Note that the invention can also be applied to other games. For example, a fighting action game or a role-playing game may be executed. In this case, the control data may be set so that the player's character acquires a new item or an additional fellow character appears upon reception of a beacon signal. For example, when installing the AP instrument 20 in an event site and setting the valid period data in the AP instrument 20 using the event period as the valid period, it becomes possible to realize a situation in which only a player who visits the event site during the event can execute a hidden scenario provided in advance or acquire a hidden item, or a hidden character appears.

In these games, the value of the parameter set for each character appearing in the game such as the player's character or another character may be changed upon reception of a beacon signal. In the case of a fighting action game, the ability values of the player's character such as a physical strength value, offensive ability, and defensive ability are changed, for example. In the case of a role-playing game, the ability values of the player's character or a fellow character are changed, or the character acquires a new technique or magic. Moreover, a parameter which is not directly related to the game process may be changed, such as changing the appearance of the player's character, for example. The parameter may be changed by decreasing the ability value or the like.

(E) Portable Electronic Instrument

The above embodiment illustrates the case where the portable electronic instrument is the portable game device 1000. Note that the invention can also be applied to other electronic instruments which can be carried by the user and include a wireless communication function, such as a portable telephone or a PDA.

(F) Wireless Communication Standard

The above embodiment illustrates the game system 1 which performs wireless communication conforming to a wireless LAN standard. Note that the invention can also be applied to network systems conforming to other wireless communication standards.

Although only some embodiments of the invention are described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A wireless network system comprising:
a wireless communication instrument; and
a portable electronic instrument;
the wireless communication instrument including:
an instrument ID storage section that stores an instrument ID of the wireless communication instrument;
a network ID storage section that stores, as a wireless network ID, data obtained by encoding data including at least specific authenticity determination data and given control data for controlling the portable electronic instrument to be decoded using the instrument ID stored in the instrument ID storage section; and
a transmission section that periodically transmits a beacon signal including the instrument ID stored in the instrument ID storage section and the wireless network ID stored in the network ID storage section, in accordance with a wireless communication standard that specifies that a wireless instrument transmits an instrument ID of the wireless instrument as an instrument ID included in transmission data; and
the portable electronic instrument including:
a reception section that receives the beacon signal;
a decoding section that decodes the wireless network ID included in the received beacon signal using the instrument ID included in the received beacon signal;
an authenticity determination section that determines whether or not the data decoded by the decoding section includes the same data as the specific authenticity determination data;
a period determination section which determines whether or not a present date is within the valid period indicated by the period data included in the data decoded by the decoding section; and
a control section that executes control based on the control data included in the decoded data when the authenticity determination section has determined that the data decoded by the decoding section includes the same data as the specific authenticity determination data;

wherein the network ID storage section of the wireless communication instrument stores data obtained by encoding data including at least the authenticity determination data, the control data, and period data indicating a valid period of control based on the control data so that the data can be decoded using the instrument ID as the wireless network ID; and the control section disregards control based on the control data when the period determination section has determined that the present date is not within the valid period, and executes control based on the control data when the period determination section has determined that the present date is within the valid period and the authenticity determination section has determined that the data decoded by the decoding section includes the same data as the specific authenticity determination data.

2. The wireless network system as defined in claim 1, wherein the instrument ID is a MAC address of the wireless communication instrument.

3. The wireless network system as defined in claim 1, wherein the beacon signal is a destination-independent signal.

4. The wireless network system as defined in claim 1, wherein the instrument ID is unique to the wireless communication instrument transmitting the beacon signal, and
the decoding section of the portable electronic instrument uses the received instrument ID as a decryption key for decoding the received wireless network ID.

5. A game process control method for execution by a portable computer capable of performing wireless communication conforming to a specific communication standard, the method comprising:
receiving a beacon signal transmitted from a wireless communication instrument, the beacon signal including 1) an instrument ID of the wireless communication instrument, and 2) a wireless network ID that is obtained by encoding data including at least specific authenticity determination data and given control data to be decoded using the instrument ID, the beacon signal being periodically transmitted from the wireless communication instrument that is located in a present wireless communication area of the portable computer in accordance with a wireless communication standard that specifies that a wireless instrument transmits an instrument ID of the wireless instrument as an instrument ID included in transmission data;
decoding the wireless network ID included in the received beacon signal using the instrument ID included in the received beacon signal;
determining whether or not the decoded data includes the same data as the specific authenticity determination data;
controlling a game process based on the control data included in the decoded data when the decoded data has been determined to include the same data as the specific authenticity determination data;
determining whether or not a present date is within the valid period indicated by the period data included in the decoded data; and
disregarding control of the game process based on the control data when it has been determined that the present date is not within the valid period and controlling the game process based on the control data when it has been determined that the present date is within the valid period and it has been determined that the decoded data includes the same data as the specific authenticity determination data;

wherein the wireless network ID is data obtained by encoding data including at least the authenticity determination data, the control data, and period data indicating a valid period of control based on the control data to be decoded using the instrument ID.

6. The game process control method as defined in claim 5, wherein the controlling of the game process includes generating a new character based on the control data.

7. The game process control method as defined in claim 5, wherein the controlling of the game process includes changing a specific parameter value set for a character appearing in the game based on the control data.

8. A non-transitory computer-readable information recording medium storing a program for causing a computer to execute the game process control method as defined in claim 5.

9. The game control method as defined in claim 5, wherein the instrument ID is a MAC address of the wireless communication instrument.

10. The game control method as defined in claim 5, wherein the beacon signal is a destination-independent signal.

11. The game control method as defined in claim 5, wherein the instrument ID is unique to the wireless communication instrument transmitting the beacon signal, and
the decoding step uses the received instrument ID as a decryption key for decoding the received wireless network ID.

12. A portable electronic instrument that can perform wireless communication conforming to a specific communication standard and execute a specific game while controlling a game process, the portable electronic instrument comprising:
a reception section that receives a beacon signal transmitted from a wireless communication instrument, the beacon signal including 1) an instrument ID of the wireless communication instrument and 2) a wireless network ID that is obtained by encoding data including at least specific authenticity determination data and given control data to be decoded using the instrument ID, the beacon signal being periodically transmitted from the wireless communication instrument that is located in a present wireless communication area of the portable electronic instrument in accordance with a wireless communication standard that specifies that a wireless instrument transmits an instrument ID of the wireless instrument as an instrument ID included in transmission data;
a decoding section that decodes the wireless network ID included in the received beacon signal using the instrument ID included in the received beacon signal;
an authenticity determination section that determines whether or not the data decoded by the decoding section includes the same data as the specific authenticity determination data;
a game process control section that controls the game process based on the control data included in the decoded data when the authenticity determination section has determined that the data decoded by the decoding section includes the same data as the specific authenticity determination data;
a determination section that determines whether or not a present date is within the valid period indicated by the period data included in the decoded data; and
a control disregarding section that disregards control of the game process based on the control data when it has been determined that the present date is not within the valid period and controlling the game process based on the control data when it has been determined that the present date is within the valid period and it has been determined that the decoded data includes the same data as the specific authenticity determination data;
wherein the wireless network ID is data obtained by encoding data including at least the authenticity determination data, the control data, and period data indicating a valid period of control based on the control data to be decoded using the instrument ID.

13. The portable electronic instrument as defined in claim 12, wherein the instrument ID is a MAC address of the wireless communication instrument.

14. The portable electronic instrument as defined in claim 12, wherein the beacon signal is a destination-independent signal.

15. The portable electronic instrument as defined in claim 12, wherein the instrument ID is unique to the wireless communication instrument transmitting the beacon signal, and
the decoding section of the portable electronic instrument uses the received instrument ID as a decryption key for decoding the received wireless network ID.

* * * * *